United States Patent Office 3,823,002
Patented July 9, 1974

3,823,002
PRECISION MOLDED REFRACTORY ARTICLES
Russell B. Kirby, Jr., Baytown, and Stephen C. Wing, Maplewood, Minn., assignors to Minnesota Mining and Manufacturing Company, St. Paul, Minn.
Filed May 5, 1972, Ser. No. 250,620
Int. Cl. B22f 3/00
U.S. Cl. 29—182.1                    19 Claims

ABSTRACT OF THE DISCLOSURE

A precision molded refractory article, which can have an intricate geometry with fine surface detail, such as an electrical discharge machining electrode, is made by molding in a flexible mold a plactic mixture of multi-modal refractory powders and a thermoplastic binder to form a green article of predetermined shape and dimensions, heating the green article to remove said binder and consolidate the refractory powders with very minimum shrinkage of the article, infiltrating the resulting porous article or skeleton with a molten infiltrant of a low melting point metal or alloy, and cooling the infiltrated skeleton, thereby forming a precision refractory article having a uniform high density, a useful working surface free of machined or otherwise disturbed metal, and a shape and dimensions precisely conforming to said green article.

---

This invention relates to a process for forming molded articles made from refractory powders and the articles so made. In another aspect, it relates to a process for making dense, molded shapes by using refractory powders and thermoplastic binders. In another aspect, this invention relates to a process for making infiltrated refractory articles and to the articles so made. In another aspect, this invention relates to a process for making infiltrated electrical discharge machining (EDM) electrodes which are replicas of an original pattern or master. In yet a further aspect, it relates to a process for forming molds or dies and to the article so made.

Molding a plastic mass of refractory powder containing plasticizer in a mold made of steel or similar rigid material mold and then sintering the resulting molded green article to make a refractory article is known in the art, e.g. U.S. Pat. 2,422,809. However, the resulting article generally has a nonuniform density because of the die wall friction which causes the article to have a higher density adjacent the surface than the core of the article.

Molding refractory powders, without use of a binder, is described in "The Linear Shrinkage Behavior of Metal powder Compacts During Sintering," by H. H. Hausner, *Proceedings of Annual Meeting, Metal Powder Industries,* vol. 19, Connecticut Publishing Inc., Hartford Conn., pages 67–85 (1963). The use of high isostatic pressure in molding material in a mold made of flexible material is also known, e.g. Hirschhorn & Gargainnier, "Journal of Metals," September 1970, pages 21–29. This latter method is limited to making articles of simple geometries because close dimensional control is difficult to obtain with this method.

Another method for making refractory articles from metal powders is slip casting, wherein a suspension of fine powder in a carrier is molded in a porous mold and the liquid evaporated or allowed to exit through the walls of the mold, followed by sintering, e.g., U.S. Pat. No. 3,489,555. This method is generally limited to making articles of thin sections because of the relatively high degree of shrinkage and cracking which occurs and affects the cast article upon removal of the carrier liquid, particularly where complex shapes are involved.

A method for forming refractory articles seeking dimensional control is disclosed in U.S. Pat. 3,351,688, wherein a refractory granular material is mixed with a meltable binder and a deflocculant, the mixture is molded into the desired configuration, the binder is burned off, and the resulting porous article sintered to the desired density.

Infiltration of skeleton bodies produced by sintering refractory metal powders is also known, e.g. see U.S. Pat. 2,581,253.

All methods which require a relatively high degree of sintering to achieve the final density result in gross shrinkage, generally 10–20 percent or higher, making precise dimensional control difficult and limiting such methods to the fabrication of simple articles where precise dimensions are not required.

Briefly, this invention comprises in one aspect mixing under vacuum multi-modal refractory powders with a thermoplastic binder at a temperature sufficient to soften the binder, cooling the resulting softened plasic mixture to solidify it, milling the solidified mass to a granular consistency, hereinafter called "pill dust," feeding the pill dust into a heated extruder to soften the pill dust and extruding the sofened mass into an evacuated vibrating elastic mold, pressurizing the mold and contents by isostatic means, and cooling and demolding the resulting green molded refractory article. The green article is placed in a nonreactive bed of refractory powder material and heated sufficiently to drive off or remove the thermoplastic binder and consolidate the refractory particles to a degree sufficient to enable the handling of the resulting porous or skeletal refractory article and obtain minimal shrinkage. The refractory skeleton is infiltrated with a melt of metal having a melting point which is considerably lower than that of the said refractory granules comprising the refractory skeleton.

This method results in a uniformly dense refractory article having a minimal dimensional shrinkage, generally less than 2 percent, and is particularly useful in making refractory articles where close dimensional tolerances are required or desirable such as those articles having intricate or complex shapes and surfaces with fine detail, such as electrodes used in electrical discharge machining (EDM).

The refractory article of this invention is a homogenous complex infiltrated article comprising at least 55 percent by volume of a first continuous phase of interconnected multi-modal refractory granules, the largest of which has a lineal dimension in cross section of 50 microns or less, said granules being interconnected in the form of a skeleton at their contiguous points of contact, there being no perceptible necking when viewed by a light microscope between the contiguous granules of the largest fraction present in said multi-modal granules, and a second continuous phase of an infiltrant metal or alloy which has a melting of said point of no more than one-half the melting point of the lowest melting refractory granules and occupies the volume of said article not occupied by said interconnected refractory granules, said article thereby comprising two intermeshed matrices and being substantially void free.

In the accompanying drawing, FIG. 1 is a cross sectional view of an assembly containing a refractory skeleton prepared for infiltrating with a lower melting material in accordance with this invention;

Figure 2:
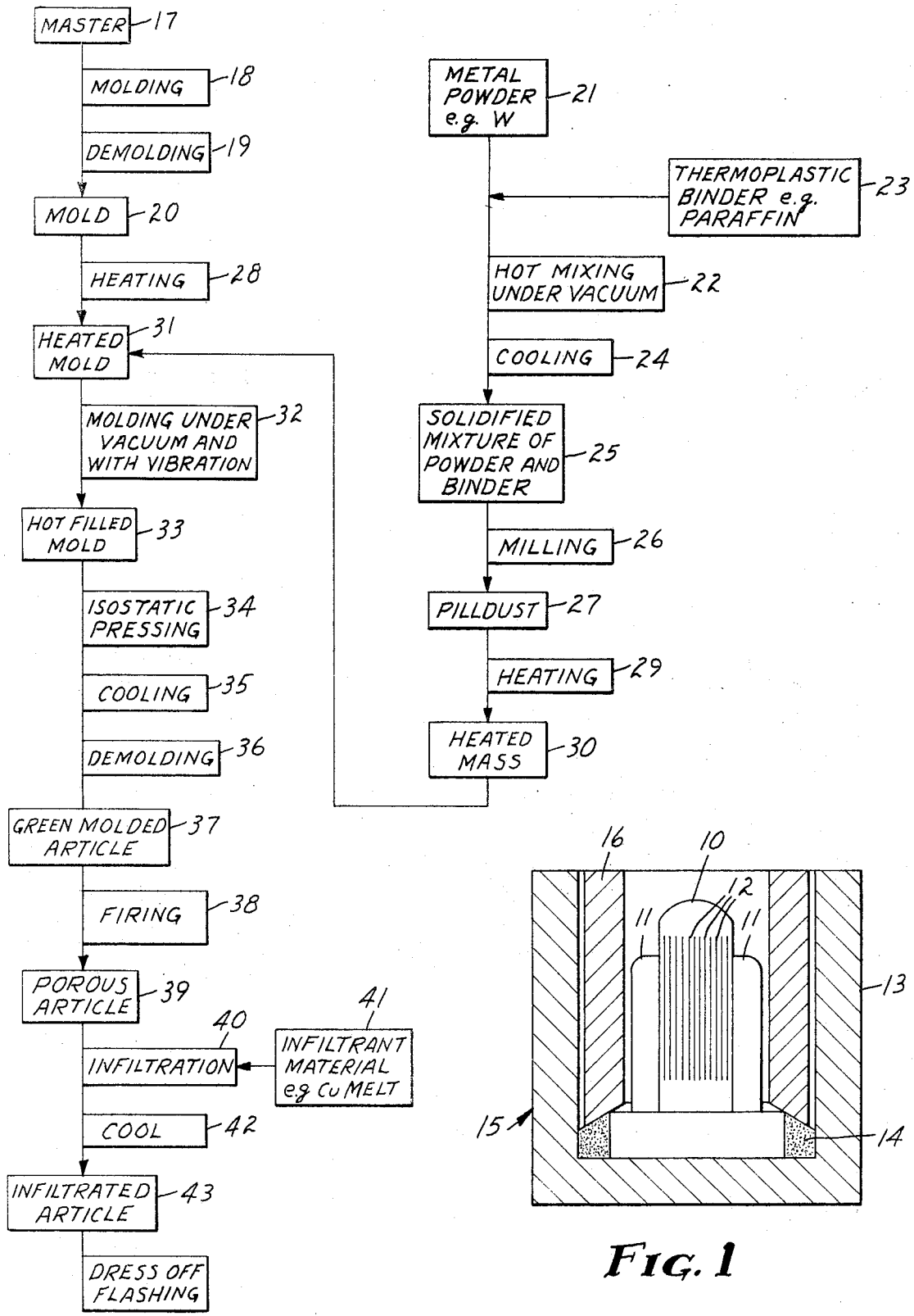
FIG. 2 is a flow diagram showing the manufacture of an electrical discharge machining electrode of this invention.

In the practice of this invention, multi-modal refractory metal powder is used, viz a mixture of two or more fractions of refractory powders having different size distributions. The use of such multi-modal powders results in a higher density of refractory material in the refractory article formed without heating beyond the first stage of sintering.

The refractory powders used in the practice of this invention to provide a refractory skeleton representatively include powders of such metals as molybdenum, tungsten, tantalum, niobium and mixtures or alloys of such metals. When a harder or more abrasion resistant skeleton is needed, such as when the refractory article to be formed is a mold cavity or die, harder refractory materials may be used, e.g. metal carbides such as tungsten carbide, titanium carbide, and silicon carbide or metal borides, one example being titanium boride. Tungsten is the refractory metal generally preferred for use in forming EDM electrodes due to its resistance to erosion during EDM operations.

The sizes of the refractory powders used to form a multi-modal mixture will generally be in the range of 50 microns to submicron in size, the preferred powders being those where all fractions are less than 15 microns in size. In admixture with one or more fractions of relatively large powders, one or more of the finer powder fractions will be included in the multi-modal mixture, the size of the finer powder and its amounts being determined by the density of refractory desired in the refractory skeleton.

The size of the refractory powders to be used will be determined by the particular refractory powder chosen and the method of preparing the powder. Whichever multi-modal mixture of refractory powders is chosen, the mixture should form a green molded article containing at least 55 volume percent and preferably 60 to 80 volume percent, refractory powder and which when heated to temperatures of about 900° to 1400° C. will form a refractory porous article or skeleton having a void volume substantially equal to the volume of the volatilized binder. The multi-modal powders may be composed of two, three or more fractions, i.e., they can be bi-modal, tri-modal quadri-modal, etc., in order to achieve the desired density. The fractions will normally have a relative size difference of at least twenty to one. One reference dealing with multi-modal powders useful in this invention is *Micromeritics*, by J. M. Dallavalle, 2d Ed., Pittman Publishing Corp., New York, N.Y. (1948).

The multi-modal powder is mixed in this invention with a small amount of a suitable thermoplastic binder sufficient to form a moldable paste-like or plastic mixture when the mixture is heated.

Examples of such binders are paraffin, e.g. "Gulf Wax," household grade refined paraffin, a combination of paraffin with a low molecular weight polyethylene, mixtures containing oleic or steric acids as well as other waxy and paraffinic substances having the softening and flow characteristics of paraffin. Whichever thermoplastic binder material is chosen, it should be meltable or soften at low temperatures, e.g. less than 180° C., preferably less than 120° C., thereby providing the molding composition with good flow properties when warmed and yet allow the molding composition to be solid at room temperature so that a green article molded therefrom can be normally easily handled without collapse or deformation. Whichever thermoplastic binder is chosen, it should burn off or volatilize when the green article is heated without causing internal pressures on the resulting refractory skeletal article due to its vaporization and without leaving substantial residue on the skeletal article formed during the heating step. Binders useful for this purpose are known in the art, e.g. U.S. Pat. No. 3,351,688.

The multi-modal powder and thermoplastic binder are warm mixed under vacuum in a blending device, eg., a sigma blade mixer, the temperature being sufficiently high to soften the thermoplastic binder thereby allowing the powder and binder to be homogeneously mixed. After the powder-binder mixture is cooled to a solid consistency, the solid mass can be ground, preferably in a vacuum, to a granular or free flowing consistency (a pill dust) for easy handling and convenient storage. Fine particles are more difficult to handle and are preferably screened out of the pill dust and returned to the warm mixing step. It is not necessary to mill the mixture into pill dust where the processing equipment will allow the warm mixture to be extruded directly from the mixer into the elastic mold although milling to a pill dust, e.g. having diameters of $\frac{1}{16}$ to $\frac{1}{2}$ inch, facilitates storage and handling.

In order to provide a mold for molding the pill dust or warm plastic mixture in a desired shape, a pattern or replica is made from a master. Molding material is poured around the master in a suitable container, the molding material cured, and the master withdrawn to form a mold which is capable of reproducing substantially identical copies of the master, including fine details and thin cross sections.

The molding materials chosen for use in the practice of this invention are those which cure to an elastic or flexible rubbery form and generally have a Shore A durometer value of about 25–50, and reproduce the fine details of the master part without significant dimensional change, i.e. without more than 2 percent linear change from the master. The molding materials should not be degraded when heated to molding temperatures, e.g. 180° C., and should have a low cure temperature, e.g. room temperature. A room temperature curing molding material will form a mold which maintains close dimensional control from master to mold. A high temperature curing molding material will generally produce a mold having dimensions substantially different from those of the master. To maintain dimensional control, it is preferable that the mold material have a low sensitivity to moisture. Examples of suitable molding materials are curable silicone rubbers, such as those described in Dow Corning Bulletin 08–347 of January 1969, and low exotherm urethane resins. Such molding materials cure to an elastic or rubbery form having a low post cure shrinkage.

The amount of molding material used to form a mold of the master can vary depending on the particular molding material used and the shape of the master. It has been found that about 10–14 cubic centimeters of molding material for each cubic centimeter of the master will form a mold which retains the desired flexible properties and also has sufficient strength to support the small hydrostatic head produced by the plastic powder-binder mass in the mold before solidification of the binder.

The molding conditions, hereinafter discussed, permit the use of an inexpensive soft, elastic or rubbery mold since there are no uncompensated forces, such as those caused by a molding ram, tending to distort the mold. The only pressure is the hydrostatic head of the plastic powder-binder mixture in the mold which is very small and causes negligible distortion. The mild molding conditions thus help ensure a precisely molded green article even though a highly deformable mold material is used. In addition, the molding technique results in a molded green article with a uniform density because of the fluidity of the powder-binder mixture and homogeneous pressure exerted on the mixture while it is being molded, as contrasted to the nonuniformity in density which results from many powder metallurgy molding techniques where objects are molded under significant pressures in relatively nondeformable or rigid molds.

The powder-binder mixture or softened pill dust is fed into an extrusion device heated slightly, e.g. 10–20° C. or higher, above the softening point of the binder component and then into the preheated elastic mold while the mold is vibrating and under vacuum. By choosing the proper size distribution of multi-modal powder and a suitable thermoplastic binder, the consistency of the powder and binder is such that when heated above the melting point of said binder, the mixture can be molded with only slight vibration to insure removal of air pockets or gas bubbles and overcome any tendency of the softened mixture to cling to the mold walls.

After filling the preheated, evacuated, vibrating elastic mold, the filled mold is inserted into a chamber where isostatic pressure, e.g. 50–150 p.s.i., is exerted on the mold and its contents, while the contents are still at a temperature above the solidification temperature of the thermoplastic binder. This isostatic pressing eliminates or removes condensable vapor bubbles from the contents of the mold which may have occurred in the vacuum molding step and assures that the molded part will be structurally homogeneous and uniformly dense.

The molded green article is cooled to room temperature while in the mold, thereby soldifying the binder and forming a solid green article which is easily demolded using a vacuum applied to the exterior of the flexible mold. This allows easy demolding of shapes which have undercuts. After demolding, the resultant green article is a faithful replica of the master. This molded article has good green strength due to the hardened matrix of thermoplastic binder bonding the refractory powder together. The refractory powder is homogeneously dispersed in the thermoplastic matrix, conducive to forming an article with uniform density which will be uniformly porous when the binder is burned off.

The uniform density of the molded object is important in the subsequent firing and infiltration steps. A uniform green density will minimize or prevent shape distortions when the molded object is heated and infiltrated. Also, a uniform density will minimize or prevent the formation of localized pockets of infiltrant material which otherwise would make the ultimate finished refractory article exhibit unstable and nonuniform electrical, mechanical or physical properties.

The green molded article is packed in a nonreactive refractory powder, e.g. alumina or silica, to prevent sagging and loss of dimension and heated in an oven to a temperature of about 900–1400° C. to remove the binder and tack the refractory particles together to form a handleable porous refractory article, preform, or skeleton. This heating step, in addition to causing removal of the binder, causes what is known in the art as "the first stage of sintering." In fact, it must be carried only so far as to cause tacking of the particles at their contiguous points of contact, but not so far as to cause more than minimal shrinkage, which would otherwise occur if heating and actual sintering proceeded further. If sintering continued, the skeleton would shrink while sintering to a higher density as the void volume decreased and the particles became joined by larger necks. The heating is carried out under a protective atmosphere, e.g. hydrogenargon, nitrogen, hydrogen-nitrogen, hydrogen, dissociated ammonia, or other neutral or reducing atmospheres known in the powder metallurgy art. An optical examination of the tacked refractory granules before or after infiltration reveals a refractory matrix comprising angular multi-modal granules with no perceptible necking between the large contiguous granules present. There exists some necking between the smaller contiguous granules, probably due to their higher surface energy at their points of contact.

The refractory skeleton is infused or infiltrated with an infiltrant metal or alloy that melts at a temperature below one-half the lowest melting point of the powders making up refractory skeleton. This infiltration takes place by capillary action without pressure applied to the infiltrant and without the formation of localized pools of infiltrant material in the refractory skeleton. Because infiltrant is uniformly distributed through the refractory body, uniform strength and electrical characteristics are obtained. The uniform distribution of the infiltrant results in minimal shape distortion of the final infiltrated objects, otherwise resulting from a nonuniform distribution due to the differences that usually exist between the thermal-expansion coefficients of the refractory matrix and the infiltrant matrix. The uniform distribution of infiltrant also eliminates "blooming" on the surface thereby minimizing the loss of dimensional tolerance and also assuring a good surface finish on the finished part. Where the finished infiltrated article is to be used as an EDM electrode, non-uniform distribution and blooming of the infiltrant can result in erratic and unpredictable electrical properties making the final object undesirable for use as an EDM electrode.

The infiltrant used will be chosen to suit the end use for the finished part. Electrically conductive alloys are suitable as infiltrants where the refractory article is to be used as an electrode or electrical connector. Where an EDM electrode is desired, infiltrants having good electrical conductivity, e.g. copper, silver, and alloys of these metals, can be used. Where a harder or stronger refractory article is desired, e.g. as for structural parts, molds or dies, the infiltrant material can be an alloy, e.g. beryllium-copper, Phosphor bronze and other precipitation hardening alloys, or nickel-copper solid solutions or steel alloys which can be further heat treated to give a hard, strong matrix. Still other metals and alloys having a melting point below that of the refractory skeleton can be used as infiltrants.

The melting point of the infiltrant material should be sufficiently lower than the lowest melting powder used in making the refractory skeleton so that there will be no significant shrinkage or distortion of the refractory skeleton during the infiltration step. To insure that there will be no excessive dimensional change, the infiltrant should have a melting point less than one-half the melting point of the lowest melting powder in refractory skeleton measured on the Absolute temperature scale, e.g. tungsten has a melting point of 3,643° K., therefore the infiltrant should melt at less than 1821° K., one example being copper. Also, the intfiltrant metal or alloy should not adversely attack or have only a mild effect on the refractory skeleton, although wetting of the refractory is required for good infiltration.

The chosen infiltrant is placed in contact wth the base of the refractory skeleton and heated above the melting point of the infiltrant. The amount of infiltrant is usually chosen to be just sufficient to fill the void volume of the skeleton. When the melting point of the infiltrant has been reached, the infiltrant will melt and wick into the refractory skeleton by capillary action. The time necessary to infiltrate the refractory skeleton will vary depending on the rate of heating, the magnitude of the skeleton being infiltrated, and wetting characteristics of the infiltrant and pore size of the skeleton. However 30 seconds to 5 minutes at a temperature slightly above about the melting point of the infiltrant has been found sufficient to properly infiltrate the refractory skeleton.

Figure 1:
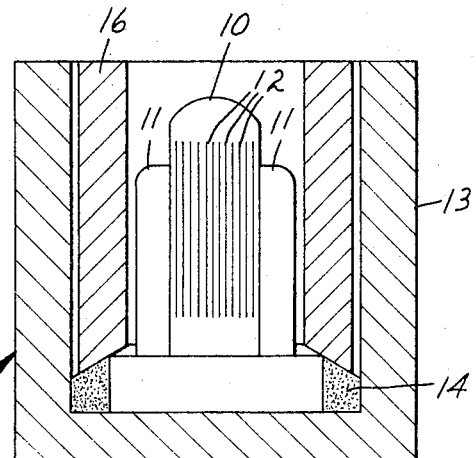

FIG. 1 shows an apparatus suitable for infiltrating refractory skeletons by capillary action. A skeleton 10 having fine details, such as fins 11 and a plurality of serrations 12, is placed in a cavity of a nonreactive crucible 13, e.g. carbon, and an amount of the chosen low melting point infiltrant 14 (such as copper beads) which is sufficient to fill the void volume of the skeleton is placed in contact with the base of the skeleton. A sleeve 16 may be inserted to confine the lower melting point infiltrant and when the resulting assembly 15 is heated above the melting point of the infiltrant, the infiltrant will melt and wick into the porous refractory skeleton by capillary action forming a dense finished article.

Figure 3:
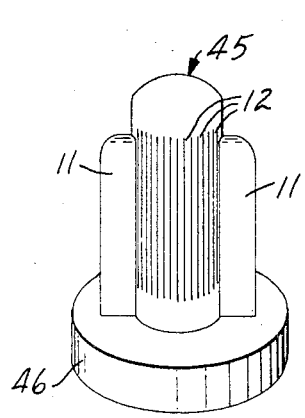
FIG. 3 is a view in perspective of an EDM electrode of this invention.
Figure 4:
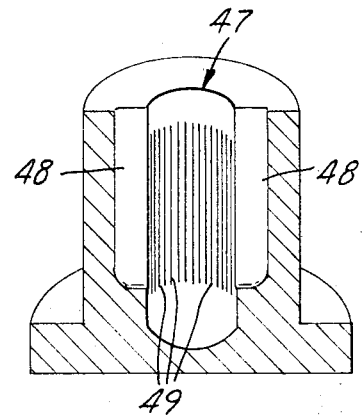
FIG. 4 is a perspective view in section of a mold of this invention useful for injection molding a plastic.

The dense finished article can be an EDM electrode 45 such as shown in FIG. 3, having fins 11, serrations 12, and a base 46 which can be molded to the configuration necessary for use in a particular electrodischarge machining machine. It is also possible to form a mold, as shown in FIG. 4, having a cavity shaped so as to allow injection molding in said cavity. The cavity shown is a negative of FIG. 3 and the chambers 48 and ribs 49 will form fins and serrations respectively on a molded plastic part.

The resulting infiltrated refractory, such as a copper infiltrated article, has a working surface which, when observed under optical magnification, shows an undisturbed refractory skeleton matrix surrounded by a cooled infiltrant matrix. When observed by a scanning electron microscope at 600 magnifications, the working surface will have a plurality of protuberances which are refractory particles surrounded by a lacy network of infiltrant material, the whole surface having a flocculent appearance. In contrast, a machined part made from copper infiltrated tungsten bar stock, when observed by scanning electron microscope at 600 magnifications, reveals a typical machined surface having disturbed metal as manifested by a series of parallel gouges, ridges or lines. Another means of surface examination, viz ion scattering as described in U.S. Pat. No. 3,480,774 and Minnesota Mining and Manufacturing Company brochure number N-A1SS (100.2)S, reveals that articles made according to the disclosures of this invention have only traces of infiltrant on the surface as contrasted to the surfaces of machined parts which show discernible concentrations of infiltrant atoms on the surface, possibly caused by smearing of the infiltrant during machining. Likewise, polishing the machined part will also result in a surface having a series of parallel scratches indicating disturbed or smeared metal.

Figure 5:
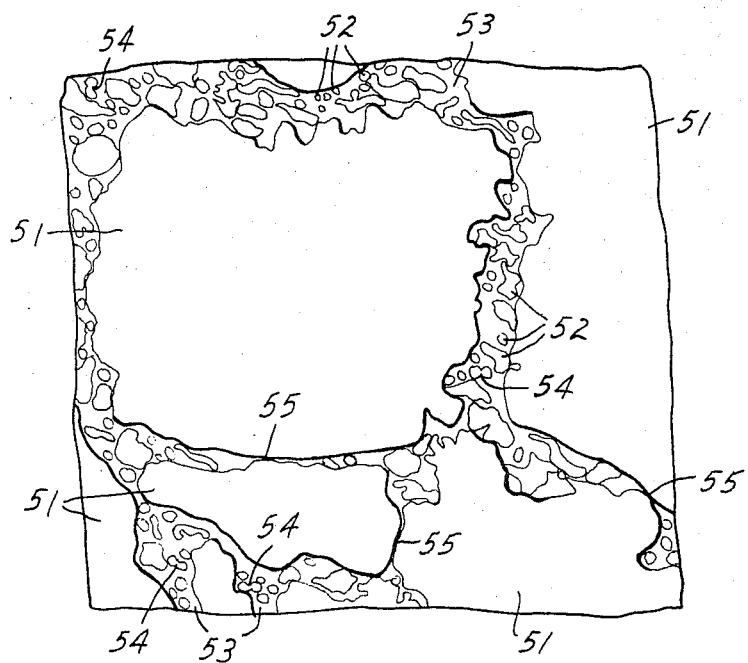
FIG. 5 is a pen-and-ink sketch of an infiltrated multi-modal refractory skeleton of this invention.

The interior of the structure of the infiltrated articles, such as represented in FIGS. 3 and 4, is illustrated by FIG. 5, a cross-sectional view of the interior at 4000× using a scanning electron microscope. In FIG. 5, the refractory matrix of multi-modal tungsten granules, comprising large granules 51 (e.g. 8.99–11.99 microns) and small granules 51 (e.g. 0.6–0.8 microns), is infiltrated with copper infiltrant 53. The smaller granules show some necking 54 at their contiguous points of contact but the larger granules do not exhibit necking at their contiguous points of contact 55.

Although the base of the article made in accordance with this invention may need machining or dressing to remove any flashing left by the infiltration step, the working surfaces of the refractory article of this invention, such as electrodes or dies, do not require further processing to meet precision tolerances of less than ±0.2 percent.

Refractory articles produced by this invention will have a characteristic density related to the volume of refractory present in the green molded article. The density of the infiltrated refractory article will be $$\rho_c \geq \rho_r(X) + \rho_i(1-X)$$

where $\rho_c$ is the density of the refractory article, $\rho_r$ is the density of the refractory powder, $\rho_i$ is the density of the infiltrant, and X is the volume fraction of refractory powder, in all cases X being at least 0.55. The density of the refractory article preferably should conform to the limitation $$\rho_c \leq \rho_r(X+0.06) + \rho_i(.94-X)$$

where X, $\rho_r$, $\rho_i$, and $\rho_c$ are as hereinbefore described.

Summarizing the above in FIG. 2, a machined master or pattern 17 (e.g. of an electrode) having the configuration shown in FIG. 3, is molded 18 using a flexible molding material, such as RTV silicone rubber. The molding material is cured by the appropriate process depending upon the flexible molding compound used and the machined matter is demolded 19 from the cured, solid rubbery mold 20. Dry refractory metal powder 21, e.g. tungsten powders, having the desired distribution of sizes are mixed and then further warm mixed 22 with a thermoplastic binder 23 in a heated evacuated system afterwhich the resulting mixture of multi-modal powder and binder is allowed to cool 24 to a solid 25. After solidification, the cooled powder-binder mixture can be milled 26 into pill dust 27. When an electrode or other precision molded part is to be made, the flexible mold 20 is preheated 28 and the milled pill dust is heated 29 and the heated plastic powder-binder mass 30 is fed through a heated extrusion device into an evacuated chamber containing the preheated mold 31 which is simultaneously vibrated 32. The resulting filled mold and its warm contents 33 are subjected to isostatic pressure 34 and the resulting mold and contents are cooled 35, followed by demolding 36 of the solidified green molded article 37. The resulting green molded article 37 is packed in a nonreactive refractory powder and fired 38 to drive off the thermoplastic binder and cause the metal particles to undergo the first stage of sintering to form a handleable porous article 39. The resulting porous article 39 is placed in a suitable container, as described above with reference to FIG. 1, and is infiltrated 40 by an infiltrant 41, e.g. copper melt, using sufficient infiltrant to fill in the void volume of the porous article or skeleton and the resulting infiltrated article 43 is cooled 42 to room temperature. The resulting infiltrated article 43 can be dressed at the site of infiltration in order to remove any flashing or unevenness at the base of the article due to the infiltration step 40. After the green molded article is demolded in step 36, the flexible mold 20 can be recycled to step 28 and preheated again thereby repeating the process to form another refractory article, all of the refractory articles made using said mold having substantially the same dimensions.

Objects and advantages of this invention are illustrated in the following examples but the various materials and amounts described in these examples, and various other conditions and details recited therein, should not be construed to limit the scope of this invention. All parts are by weight unless otherwise specified. The sizes of the powders used in this invention are stated in microns as measured by a Fisher 'Sub-Sieve Sizer" per ASTM–B–330.

EXAMPLE 1

A female mold of a machined metal master EDM electrode was made from a room temperature curable silicone rubber (viz RTV–E silicone). A bimodal distribution of tungsten powder was made by mixing 65 parts 8.00–11.99 micron tungsten powder and 35 parts of 0.720–0.99 micron tungsten powder. The resulting bimodal powder mixture was mixed with paraffin, ("Gulf Wax") in the ratio of 60 volume percent powder mixture to 40 volume percent paraffin, under a vacuum of less than 70 millimeters of Hg. The mixing was done in a heated (70–100° C.) sigma blade mixer until the powder and the binder were uniformly mixed.

The powder-binder mixture was cooled to room temtemperature and ground to pill dust in the sigma blade mixer. The pill dust was extruded by a heated (100° C.) screw extruder into the female mold which had been preheated to about 95° C. Simultaneously with extrusion, the mold was agitated by means of a vibrator, the mold and extrusion orifice being under a vacuum of less than 200 millimeters of Hg to remove any entrained air. The still warm, filled mold was removed from the vacuum chamber and placed in a pressure chamber where an isostatic pressure of 7 kg./cm.² was applied, afterwhich the mold and molded article were cooled in water to 10° C. and the green powder-binder shape demolded.

The solidified green shape was packed in a supporting bed of powdered alumina and fired in a resistance heated split-tube furnace under a hydrogen atmosphere at 1000–1100° C. for 6 hours. The paraffin wax was removed cleanly at a temperature below 500° C., and the remaining tungsten refractory skeleton fired to cause an easily handleable green article at the temperature of 1000° C. without shape distortion.

The resulting skeleton was infiltrated with copper in a hydrogen atmosphere by placing the tungsten skeleton in a graphite crucible and sufficient copper metal powder was placed around the base of the skeleton in an amount sufficient to just fill the void volume present in the skeleton article. Upon heating the assembly (shown in FIG. 1) to 1150° C., the copper melted and wicked, by means of capillary action, into the refractory tungsten skeleton and the infiltrated EDM electrode was cooled to room temperature. Three such electrodes were made using the technique of this example and they contained 60–62.5 volume percent tungsten. Under optical examination, the refractory matrix will show slight necking at the contiguous points of contact of the smaller granules but no necking at the contiguous points of contact of the larger granules present. The infiltrant will be homogeneously dispersed as a second intermeshed matrix.

The diameter of the machined master electrode used to create the RTV silicon mold measured 0.870 cm. The comparable diameters of the three molded electrodes (shown in FIG. 3) made in this example measured 0.854 cm., 0.854 cm., and 0.856 cm. without machining or otherwise finishing the working surface of the electrodes, thus demonstrating the preparation according to the invention of molded refractory articles with fine tolerances.

The cutting action of one of the resulting EDM electrodes was tested on a "Cintrojet" Electrical Discharge Machining Machine by forming a mold cavity in an AISI 1020 steel block. The cutting time to form the cavity was 55 minutes at a frequency of 50,000 cycles per second. The capacitance setting on the EDM machine was 10 microfarads at 40 volts and 14 amps. The electrodes of this example removed 4.0 grams of steel while losing 1.5 grams of electrode material. The electrode penetration into the 1020 steel block was 1.07 cm. while the electrode wear was a 0.24 cm.

EXAMPLE 2

Example 1 was repeated using a molding composition of 65 volume percent of the tungsten powder, and 35 volume percent of a binder comprising 100 parts paraffin and 5 parts low molecular weight polyethylene ("Epolene" N–11").

The tungsten-binder shape was packed in 160 grit silicon carbide for support during the firing procedure. The binder was removed and the part consolidated by heating to 1100° C. in an atmosphere of 95 volume percent nitrogen and 5 volume percent hydrogen. The tungsten skeleton was infiltrated by placing the base of it in contact with copper powder as described in Example 1 and heating to 1150° C. The master as formed has a cylindrical base having a diameter of 0.499 inches and the replica's diameter was 0.497 inches.

EXAMPLE 3

A bi-modal powder mixture was formed by mixing 65 volume percent molybdenum powder of 4.0–6.0 micron size with 35 volume percent tungsten powder of 0.5 micron size. The 60 volume percent of the resulting powder was mixed with 40 volume percent of the thermoplastic binder of Example 2 and molded as in Example 1. The resulting molded green article was packed in granular $Al_2O_3$ followed by firing and infiltrating as described in Example 2.

EXAMPLE 4

The tungsten-binder mixture of Example 2 was molded and the resulting green article heated in a bed of crushed alumina as described therein. The resulting porous article was infiltrated in a dry hydrogen atmosphere with silver by placing sufficient powdered silver around the base of the porous article and heating the assembly to 1200° C. The master's diameter as in Example 2 was 0.499 inch and the replica's diameter was 0.490.

EXAMPLE 5

Example 4 was repeated substituting a piece of beryllium-copper alloy ("Berylco" 25) for the silver powder and heating the assembly to 1100° C. in a dry hydrogen atmosphere.

EXAMPLE 6

Example 4 was repeated substituting a piece of brass alloy (65 weight percent copper-35 weight percent zinc) for the silver powder, and heating the porous skeleton to 1000° C. under a dry hydrogen atmosphere. The master's diameter as in Example 2 was 0.499 inch and the replica's diameter was 0.492 inch.

EXAMPLE 7

Example 4 was repeated substituting a piece of "Monel K" bar stock for silver and heating to 1350° C. under a dry hydrogen atmosphere.

EXAMPLE 8

The bi-modal powder of Example 1 was mixed with 40 volume percent of a thermoplastic binder comprising 34.9 parts low molecular weight polyethylene ("Epolene" N–11) 33.3 parts oleic acid, and 31.8 parts stearic acid and the mixture molded as described in Example 1.

The base of the resulting molded article was placed in contact with copper powder, and the assembly surrounded with powdered alumina. The assembly was heated to 500° C. at the rate of 240° C. per hour followed by heating to 1150° C. at a rate of 300° C. per hour, resulting in an infiltrated article in only one heating step. The infiltrated article when cooled to room temperature had a diameter of 0.500 inch and the original machined master having the shape of an EDM electrode had a diameter of 0.499 inch as in Example 2.

EXAMPLE 9

A bi-modal tungsten powder comprising 70 volume percent 8.00–11.99 micron tungsten powder and 30 volume percent 0.720 to 0.99 micron tungsten powder, was mixed with 35 volume percent of the thermoplastic binder of Example 2. The resulting mixture was used to make an infiltrated EDM electrode following the process of Example 1.

EXAMPLE 10

An isocyanate-terminated prepolymer was formed by reacting 155 parts of methylene bis(phenyl isocyanate) with 23.75 parts of propylene ether glycol having a molecular weight of 200 and 26 parts of propylene ether glycol having a molecular weight of 2000 as in U.S. Pat. No. 3,635,848, Example 6. A catalyst was made by reacting 675 parts of triethylene glycol with 46.5 parts of powdered boric acid and treating the resulting product with potassium hydroxide according to the teachings of said U.S. Pat. 3,635,848.

To 200 parts of a 3000 M.W. polypropylene oxide triol ("Thanol" 3002), was added 4.4 parts of said catalyst and the resulting solution thoroughly mixed. 220 parts of the isocyanate prepolymer was added to the catalyzed triol and mixed using a three blade mixer. The blended mixture was degassed at room temperature under 50 Torr for less than 5 minutes. The reaction mixture was poured around a machined metal master and again degassed under a vacuum of 50 Torr for less than 5 minutes. The mold material was allowed to cure for 24 hrs. at room temperature to make a rubbery poly(urethane-isocyanurate) mold. Using this mold and the thermoplastic-powder mixture of Example 2, the steps of Example 1 were repeated to form a dense EDM electrode.

EXAMPLE 11

A bi-modal tungsten carbide powder was formed by mixing 65 parts 25 micron tungsten carbide powder with 35 parts 2 micron tungsten carbide powder. Forty volume percent paraffin was added and the resulting powder-binder mixture warm blended at 70–100° C. in a sigma blade mixer under a vacuum of 70 Torr for several hours.

The resulting powder binder mixture was extruded into a warm flexible mold as in Example 1. After cooling, the resulting green molded article was demolded, packed in a supporting bed of crushed alumina, and fired at 1120° C. with a 15 minute soak. The firing was done under an atmosphere of 95 volume percent argon and 5 volume percent hydrogen. The porous fired, consolidated article had a dimensional increase of approximately 0.003 centimeter per centimeter.

The porous article in the shape of an injection molding cavity was infiltrated with a copper alloy ("Berylco 25") containing about 1.8 to 2 weight percent beryllium and cooled. The infiltrated mold was cut in half. One-half of the infiltrated article solution annealed at 1470° F. for one hour and precipitation hardened at 600° F. for 2 hours under a protective atmosphere of nitrogen. Both halves of the infiltrated mold were polished and metallographically examined at 1200 magnifications indicating the porous refractory skeleton was infiltrated. The hardness of the untreated half was 38 $R_c$ and the hardness of the heat treated half was 47 $R_c$. The articles of this invention are amenable to solution treatment to develop desired properties without deleteriously changing the precision dimensions of the as-molded article.

EXAMPLE 12

A bi-modal tungsten carbide powder was formed by mixing 65 parts 25 micron tungsten carbide powder with 35 parts 2 micron tungsten carbide powder. The resulting bi-modal powder was mixed with 40 percent by volume paraffin and the resulting powder-binder mixture blended as in Example 1.

A machined master having a truncated conical design and a volume of about 2.4 cubic centimeters was used to form a mold from about 28 cubic centimeters of the molding compound of Example 1. The resulting mold was treated with a release agent comprising 5 percent petroleum jelly in 95 percent dichloromethane and about 280 centimeters of molding compound poured into the first mold forming a second mold.

Using the procedure of Example 1, the tungsten carbide-binder mixture was molded in the second mold and processed as in Example 11 to form a die cavity. The die cavity was tested by injection molding several polypropylene ("Amoco" 1046) pieces which were faithful replicas of the machined masters. This technique allows the formation of a die cavity from a machined male master or part without having to machine a female master.

Various modifications and alterations of the invention will become apparent to those skilled in the art without departing from the scope and spirit of this invention, and it should be understood that this invention is not to be limited to the illustrative embodiments and examples set forth herein.

What is claimed is:

1. A shaped homogeneous refractory article having a working surface and comprising at least 55 percent by volume of a first continuous phase of multi-modal refractory granules comprised of larger and smaller granules interconnected at their contiguous points of contact in the form of a skeletal matrix having a uniform density, there being no perceptible necking between the largest contiguous granules present in said skeletal matrix when viewed by a light microscope, and a second continuous phase of metal or alloy which has a melting point of no more than one-half of the melting point, as measured on the absolute temperature scale, of the refractory granules, and which is uniformly distributed and occupies the volume of said article not occupied by said skeletal matrix, said article thereby comprising intermeshed matrices and being substantially void free.

2. The article of claim 1, wherein said refractory granules are less than 45 microns in size.

3. The article of claim 1, wherein the working surface is free of disturbed metal.

4. The article of claim 1, wherein the smaller granules of said skeletal matrix have perceptible necking at their contiguous points of contact.

5. The article of claim 3 where said refractory granules are of molybdenum.

6. The article of claim 3, where said refractory granules are of tungsten.

7. The article of claim 3, where said refractory granules are a mixture of tungsten and molybdenum granules.

8. The article of claim 1 where said second phase is copper.

9. The article of claim 1 where said second phase is a bronze alloy.

10. The article of claim 1, wherein said second phase is a brass alloy.

11. The article of claim 1 where said second phase is a tin alloy.

12. The article of claim 1 wherein said refractory granules are metal carbide granules.

13. The articles of claim 12 where said metal carbide is tungsten carbide.

14. The article of claim 12 where said second phase is a hardenable alloy.

15. The article of claim 14 where said alloy is beryllium-copper alloy.

16. The article of claim 14 where said alloy is steel alloy.

17. A homogeneous refractory metal article comprising at least 55 percent by volume of a first continuous phase of multi-modal tungsten granules interconnected at their contiguous points of contact in the form of a skeletal martix having a uniform density, there being no perceptible necking between the largest contiguous grains present in said skeletal matrix when viewed by a light microscope, and a second continuous phase or copper which is uniformly distributed and occupies the volume of said article not occupied by said skeletal matrix, said article thereby comprising two intermeshed matrices and being substantially void free.

18. The article of claim 17, wherein said article is an electrical discharge machining electrode.

19. The article of claim 1, where the largest granule fraction of said multi-modal granules has a lineal dimension in cross section of 50 microns or less and the relative size differences between the multi-modal powders is at least 10 to 1.

References Cited

UNITED STATES PATENTS

| | | | |
|---|---|---|---|
| 3,285,714 | 11/1966 | Davies et al. | 29—182.1 |
| 3,407,048 | 10/1968 | Krock et al. | 29—182.1 |
| 3,438,753 | 4/1969 | Kenney et al. | 29—182.1 |
| 3,366,463 | 1/1968 | Schreiner | 29—182.1 |
| 3,467,517 | 9/1969 | Zdanak et al. | 29—182.1 X |
| 3,175,260 | 3/1965 | Bridwell et al. | 29—182.1 X |
| 2,851,381 | 9/1958 | Moyer | 29—182.1 X |
| 3,290,124 | 12/1966 | Holtzclaw | 29—182.1 |
| 3,356,618 | 12/1967 | Rich et al. | 252—478 |

STEPHEN J. LECHERT, JR., Primary Examiner

U.S. Cl. X.R.

29—182.8

UNITED STATES PATENT OFFICE
CERTIFICATE OF CORRECTION

Patent No. 3,823,002　　　　　　　　Dated July 25, 1974

Inventor(s) Russell B. Kirby, Jr. and Stephen C. Wing

It is certified that error appears in the above-identified patent and that said Letters Patent are hereby corrected as shown below:

Col. 7, line 37 should read "52" instead of "51".

Col. 7, line 69 should read "master" instead of "matter".

Col. 12, line 39 should read "of" instead of "or".

Signed and sealed this 8th day of October 1974.

(SEAL)
Attest:

McCOY M. GIBSON JR.　　　　　　　　C. MARSHALL DANN
Attesting Officer　　　　　　　　　Commissioner of Patents